June 21, 1960  E. A. GLYNN  2,941,584
TIRE DETREADING MACHINE

Original Filed March 3, 1953  7 Sheets-Sheet 1

Fig. 1

INVENTOR.
Edwin A. Glynn
BY
ATTYS

June 21, 1960 E. A. GLYNN 2,941,584
TIRE DETREADING MACHINE
Original Filed March 3, 1953 7 Sheets-Sheet 5

INVENTOR.
Edwin A. Glynn
BY
ATTYS

June 21, 1960  E. A. GLYNN  2,941,584
TIRE DETREADING MACHINE

Original Filed March 3, 1953  7 Sheets-Sheet 6

INVENTOR.
Edwin A. Glynn
BY
ATTYS

June 21, 1960 E. A. GLYNN 2,941,584
TIRE DETREADING MACHINE
Original Filed March 3, 1953 7 Sheets-Sheet 7

INVENTOR.
Edwin A. Glynn
BY
ATTYS

United States Patent Office 2,941,584
Patented June 21, 1960

2,941,584

TIRE DETREADING MACHINE

Edwin A. Glynn, Lodi, Calif., assignor to Super Mold Corporation of California, Lodi, Calif., a corporation of California Continuation of application Ser. No. 340,023, Mar. 3, 1953. This application Apr. 1, 1957, Ser. No. 650,050

4 Claims. (Cl. 157—13)

The present invention relates generally to a machine for use in preparing tread worn tires for retreading or recapping, especially tires of large size such as are used on trucks, wheeled earth moving equipment, or the like; this application being a continuation of application, Serial No. 340,023, filed March 3, 1953, and later abandoned.

In particular the invention is directed to, and it is a major object to provide, a novel machine operative to remove the worn tread from a used tire preparatory to the application of new tread rubber or camelback to the tire for subsequent vulcanization onto the same.

Another object of this invention is to provide a machine, for the purpose described, which embodies—in novel combination—a mechanism which supports and power rotates the tire; and a power driven, worn tread removing device mounted for movement transversely of the plane of rotation of the tire, with an included rotary cutter traversing the worn tread from shoulder to shoulder in an arcuate path of predetermined radius relative to the supported and driven tire, whereby the desired mount of worn tread is removed, and on a curvature generally corresponding to that of the cross section of the tire crown.

An additional object of the invention is to provide a tire detreading machine, as above, which includes a novel guiding track and drive mechanism for the worn tread removing device.

A further object of the invention is to provide a tire detreading machine which is capable of ready adjustment so as to accommodate large tires of different sizes.

It is also an object of the invention to provide a tire detreading machine which is designed for ease and convenience of control by an operator.

Still another object of the invention is to provide a tire detreading machine which includes, as an attachment, a so-called stitching roller adapted for use to firmly and evenly adhere the new tread rubber or camelback to the tire after removal of the worn tread, application of cement to the prepared tread receiving surface, and initial manual application of such new tread rubber or camelback thereto; there being novel, normally inactive means adapted to be placed in operation to hold the tire against rotation, as is desirable when the new tread rubber or camelback is being manually applied.

A still further object of the invention is to provide a practical and reliable machine for rapidly, positively, and accurately removing the worn tread from a tire.

These objects are accomplished by means of such structure and relative arrangement of parts as will fully appear by a perusal of the following specification and claims.

Referring now more particularly to the drawings, and to the characters of reference marked thereon, the tire which is to be detreaded is indicated at 1; such tire being supported, with its axis horizontal, on a tire mounting drum unit, indicated generally at 2. Such unit includes a radially adjustable or expansible rim assembly 3 on which the tire beads 4 rest. Lateral separation of the tire beads 4 on the rim assembly is prevented by means, on each side of said assembly, of a row of circumferentially spaced hand screws 5.

The tire mounting drum unit 2 is journaled for rotation on a spindle 6 which extends laterally out from the tire a substantial distance, being carried in a horizontal sleeve 7 included as a rigid part of a fixed, upstanding frame 8 of open or skeleton construction.

The upstanding frame 8 is thus disposed laterally to one side of the tire 1; such frame being fixed, at its lower end, in connection with a pair of spaced, parallel, laterally extending rails 9 secured to the floor.

Figure 10:
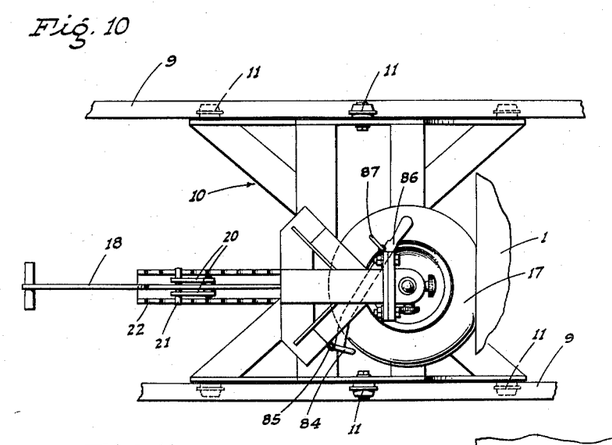
Fig. 10 is a fragmentary top plan view showing the tire rotating mechanism and the included carriage.

As shown particularly in Figs. 10 and 11, a carriage 10 is supported on the rails 9, for to-and-fro motion relative to the tire 1, by means of rollers 11 on each side of such carriage which engage above and below the top flanges of the related rails 9.

The carriage 10 includes, within the confines of the frame 8, a separate upstanding frame 12 fitted, at the top and front, with a journal 13 for the upper end of a vertical shaft 14 which extends downwardly from the journal 13 some distance to connection with the vertical output shaft of a reduction gear box 15 driven by an electric motor 16.

The reduction gear box 15 and electric motor 16 have suitable pedestal support on the carriage 10.

Figure 13:
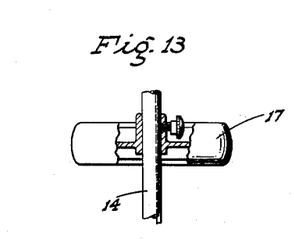
Fig. 13 is a fragmentary elevation, partly in section, on line 13—13 of Fig. 11.

A rubber-tired, friction drive wheel 17 is vertically adjustably secured to the shaft 14, as shown in Fig. 13. Upon advance of the carriage 10 the drive wheel 17, which has previously been properly vertically adjusted, abuts the adjacent side of the tire 1 in driving relation thereto; the wheel 17 being driven by the shaft 14, reduction gear box 15, and electric motor 16 in a direction such that the tire 1 is rotated to turn upwardly on what may be termed the front, and as shown by the arrow in Fig. 2.

The carriage 10 is advanced in the direction of the tire 1, so as to properly engage wheel 17 therewith, by means of the following:

A push handle 18 is pivoted, as at 19, to the outer end of the carriage 10, and thence extends outwardly for vertical swinging motion; such handle 18 being fitted, intermediate its ends, with a toggle linkage 20 which includes, at its free ends, a cross pin 21. The handle 18 is first used in a raised position, as in dotted lines in Fig. 11, to push the carriage 10 as far as possible toward the tire 1, and then the cross pin 21 is engaged, by initial lowering of the handle 18, into a ratchet bar 22 fixed lengthwise between the rails 9; final lowering of the handle 18 carrying the toggle linkage 20 beyond deadcenter, locking said handle in a position holding the carriage 10 with the drive wheel 17 forcefully engaged against the side of the tire 1.

With the foregoing mechanism the tire 1 is forcefully rotated, at relatively slow speed, for the purpose of detreading by means of the worn tread removing device now to be described, and which is constructed as follows:

A pair of longitudinal, transversely spaced, parallel rails 23 of I-beam form are fixed to the floor and project forwardly from adjacent the bottom of a supported tire 1 to a point a substantial distance ahead thereof; such rails being equi-distantly spaced on opposite sides of said tire.

An upstanding frame 24, rectangular in plan, is supported from the rails 23 for longitudinal movement therealong by corner rollers 25. Such rollers 25 are maintained on the rails 23 and guided therealong by means of longitudinal cables 26 stretched taut atop said rails, and the rollers 25 being grooved and riding the cable.

Adjustment of the frame 24 to and fro on the rails 23 is accomplished by a foot actuated spider wheel 27 on a spindle 28 to which one of the rollers 25 is secured; the cable winding about such one roller.

By foot actuating the spider wheel 27, the corresponding roller 25 is caused to travel on the related cable to either advance or retract the upstanding frame 24.

The frame 24 is normally maintained against movement on the rails 25 by means of a double-ended foot pedal actuated brake or clamping unit 29 which cooperates between an adjacent portion of said frame 24 and the upper flange of one of the rails 23.

The clamping unit 29 includes upper and lower shoes 30 and 31 lying above and below the top flange of the adjacent rail 23. The lower shoe 31 is adapted to be worked by an over-dead-center linkage 32 between a released position and a position clamping the rail flange between said shoe 31 and the shoe 30. The linkage 32 is foot-actuated by pedals 33 and 34; depression of one pedal causing the clamping unit 29 to function, while depression of the other pedal releases such unit. The foregoing clamping unit is shown particularly in Figs. 14 and 15.

The upstanding frame 24 supports, at the top thereof, and in fixed relation, a horizontal, substantially semicircular track 35 of T-shape in cross section; such track being disposed symmetrically to the tire 1 supported by the tire mounting drum unit 2.

The track 35 is disposed in a horizontal plane below the axis of the tire 1, and such track extends, intermediate its ends, through a hollow, open-ended housing 36; the housing 36 being supported from the track 35 for guided movement along the latter, in the following manner:

The top flange of the track 35 forms, in effect, a horizontal arcuate rail 37 which is engaged, on opposite edges, by a transversely spaced pair of inner supporting wheels 38 carried on vertical spindles 39, and a transversely spaced pair of outer supporting wheels 40 journaled in spring-pressed yokes 41.

The wheels 38 and 40 are peripherally grooved, and the corresponding edges of the horizontal rail 37 matchingly engage in such grooves.

The housing 36 is stabilized or guided in its movement along the track 35 by a pair of transversely spaced inner rollers 42 carried on vertical spindles 43 and a transversely spaced pair of outer rollers 44 journaled in spring pressed yokes 45; the rollers 42 and 44 bearing against the track 35 adjacent the lower edge thereof and on opposite sides. With this arrangement, the housing 36 is supported and guided for travel along the track 35. See particularly Fig. 4. The housing 36 is reversibly power driven along the track 35 as follows:

A rubber-tired friction drive wheel 46 is disposed in the housing 36 outwardly of the track 35 and below the rail 37 of the latter; such drive wheel 46 being secured on a vertical spindle 47 suitably journaled in said housing 36. At its lower end portion the spindle 47 is fitted with a pinion 48 in mesh with a worm 49 on the inner end of a longitudinal shaft 50 which projects outwardly from the housing 36. See particularly Fig. 9.

Outside of the housing 36 the shaft 50 is selectively engaged in driven relation with a large pulley 51 or an opposed smaller pulley 52 by means of a reversing clutch unit 53 controlled by a hand lever 54.

Figures 4, 18:
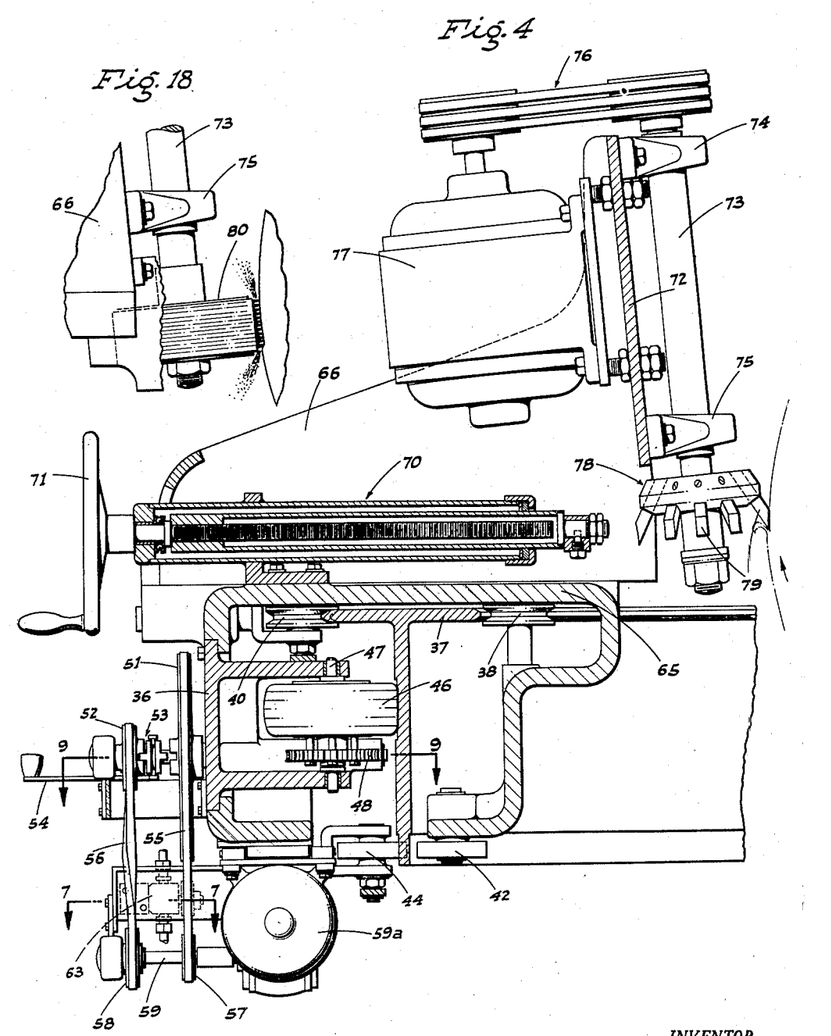
Fig. 4 is a vertical sectional elevation on line 4—4 of Fig. 3.
Fig. 18 is a fragmentary elevation showing the rotary rasp as mounted on the driven spindle.

The pulleys 51 and 52 are driven, in the same direction, by endless belts 55 and 56 which extend at their opposite and lower ends about pulleys 57 and 58 on a horizontal drive shaft 59 actuated by an electric motor and reduction gear unit 59a mounted in connection with, and depending from, the lower part of the housing 36, as clearly shown in Fig. 4.

When the clutch unit 53 couples the large pulley 51 to shaft 50, the housing 36 is caused to travel on the track 35 at relatively slow speed, while coupling to pulley 52 produces a relatively faster travel of the housing 36, and in the opposite direction. The purpose of this arrangement will hereinafter appear.

Figures 5, 6, 7, 8, 9:
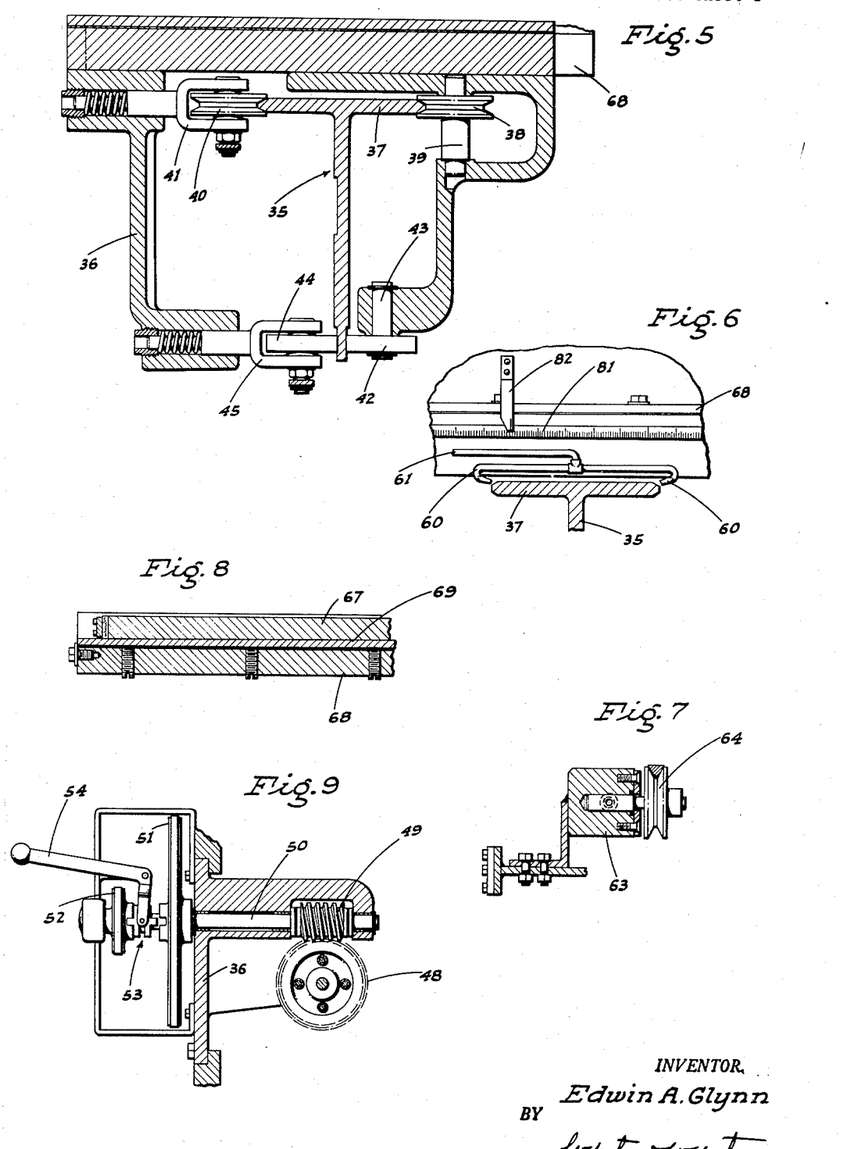
Fig. 5 is an enlarged fragmentary vertical sectional elevation on line 5—5 of Fig. 3.
Fig. 6 is an enlarged fragmentary vertical sectional elevation on line 6—6 of Fig. 3.
Fig. 7 is an enlarged fragmentary sectional plan view on line 7—7 of Fig. 4.
Fig. 8 is an enlarged fragmentary sectional plan view on line 8—8 of Fig. 3.
Fig. 9 is an enlarged fragmentary sectional plan view on line 9—9 of Fig. 4.

In order that the edge portions of the horizontal rail 37 remain clean at all times, and to prevent any binding of the wheels 38 and 40 thereon, air blast nozzles 60 are mounted on the housing 36 at opposite ends thereof and in positions discharging directly onto said edges of the rail. The nozzles 60 are fed by a distributing conduit system, indicated generally at 61, which derives air under pressure from a supply conduit 62; there being an interrupter valve 63 interposed in the conduit 62. The interrupter valve, as shown in Fig. 7, is suitably mounted in a position with a driving pulley 64 in engagement with the endless belt 55. By employing the interrupter valve 63, the air blasts from the nozzles 60 are intermittently pulsed, producing a more effective pneumatic cleaning action on the wheel engaging edge portions of the rail 37.

The housing 36 includes a top plate 65, and a carriage 66 is disposed thereon. Such carriage 66 includes longitudinal, transversely spaced slides 67 slidably held within the confines of cooperating longitudinal guideways 68; there being adjustable friction plates 69 between the slides 67 and adjacent guideways 68. See Fig. 8.

The carriage 66 is adapted to be manually adjusted to and fro on the housing 36 by an adjustment screw unit, indicated generally at 70, which unit includes a hand wheel 71.

At the end adjacent the supported tire 1 the carriage 66 includes an upstanding mounting plate 72 facing said tire, and an upstanding spindle 73 is carried by said plate in upper and lower journals indicated at 74 and 75; the spindle 73 projecting some distance below the journal 75. At its upper end the spindle 73 is driven by an endless belt and pulley unit 76 from an electric motor 77 mounted on the back side of the mounting plate 72 above the adjustment screw unit 70.

For the purpose of initial cutting away of the worn tread from the tire 1 the spindle 73 is fitted, at its lower end, with a rotary cutter 78 which includes a row of circumferentially spaced cutter teeth 79 which extend at an outward and downward incline from the cutter body.

To initially cut the worn tread from the tire 1, the upstanding frame 24 and semi-circular track are rough-adjusted relative to the tire 1 by means of the foot actuated spider wheel 27, with the clamping unit 28 then released. After such adjustment the clamping unit 29 is reengaged.

Following the above operation the carriage 66 is fine-adjusted on the housing 36 by operation of the screw unit 70; the adjustment being such as to bring the rotary cutter teeth 79 in proper position for engagement with the worn tread of the tire 1. Thereafter, with the rotary cutter 78 traveling at high speed, under the drive of the motor 77, the clutch unit 53 is engaged so that the shaft 50 is driven from the large pulley 51, producing relatively slow turning of the friction drive wheel 46 which runs against the track 35. This causes the housing 36, together with the carriage 66 and the supported rotary cutter 78, to traverse an arcuate path substantially concentric to and about the crown of the tire. When this occurs, the rotary cutter 78 effectively severs the worn tread from the tire; the latter simultaneously being rotated in the direction indicated by the arrow in Fig. 2 through the medium of the friction drive wheel 17.

Each traversing motion of the rotary cutter 78, by reason of the travel of housing 36 on track 35, is from one side of the worn tread on the tire to the other, and after each such traversing movement the clutch unit 53 is reversed; i.e., positioned to engage the shaft 50 with the small pulley 52. This results in a relatively fast return of the housing 36, carriage 66, and rotary cutter 78 to its starting position. Thereafter, a further adjustment of the carriage 66 toward the tire is made, to the end that the next traversing motion of the rotary cutter 78 may occur; it being understood that several such passes of said rotary cutter are usually required for sufficient removal of the worn tread from the tire.

By reason of the employment of the semi-circular track 35 symmetrically disposed relative to the tire 1, the rotary cutter 78, on each of its traversing motions, irrespective of the position of in or out adjustment, effects the arcuate cut on the tire following substantially the curvature of the crown of the latter, and as is desirable for proper preparation of the tire for retreading or recapping.

After rough-cutting of the worn tread material from the tire 1 by the rotary cutter 78, such cutter is removed from the spindle 73, and a toothed, rotary rasp 80 is secured to said spindle. See Fig. 18. Thereafter, with operation of the mechanism just as in connection with the rotary cutter 78, and as above described, the rotary rasp 80 is caused to traverse the crown of the tire 1 in engagement therewith; the rasp finishing the worn tread removal operation to within very accurate limits, yet leaving the surface roughened, as is necessary for subsequent effective application of the new tread rubber or camelback.

In order that the operator may have a visual indication of the extent of adjustment of the carriage 66 to and fro on the housing 36, a longitudinal scale 81 is affixed horizontally to one of the guideways 68, and a pointer 82 on carriage 66 reads on such scale.

After the rotary cutting and rotary rasping operations on the tire, the carriage 66 is adjusted away from the tire and the rasped crown surface of the latter has a coating of liquid rubber cement applied thereto, followed by the application, by hand, of the new tread rubber or camelback 83 to said crown surface.

During the course of the manual application of the camelback 83 to the tire 1, it is desired that such tire be held in certain positions against rotation, and this is accomplished as follows:

The upstanding frame 12 in carriage 10 is fitted with a vertical, normally spring-retracted braking plate 84, hinged—as at 85—adjacent and for swinging motion toward the friction drive wheel 17.

At its upper end the braking plate 84 is secured to a horizontal hand lever arm 86. Upon swinging motion of the lever arm 86 in an appropriate direction, the braking plate 84 is caused to bind against the friction drive wheel 17, which is then stationary, as the motor 16 is out of operation. This prevents the wheel 17 from rotating, and such wheel in turn holds the tire 1 against rotation. The lever arm 86 is adapted to be latched in either its operative or inoperative positions by a latch device 87.

Figure 11:
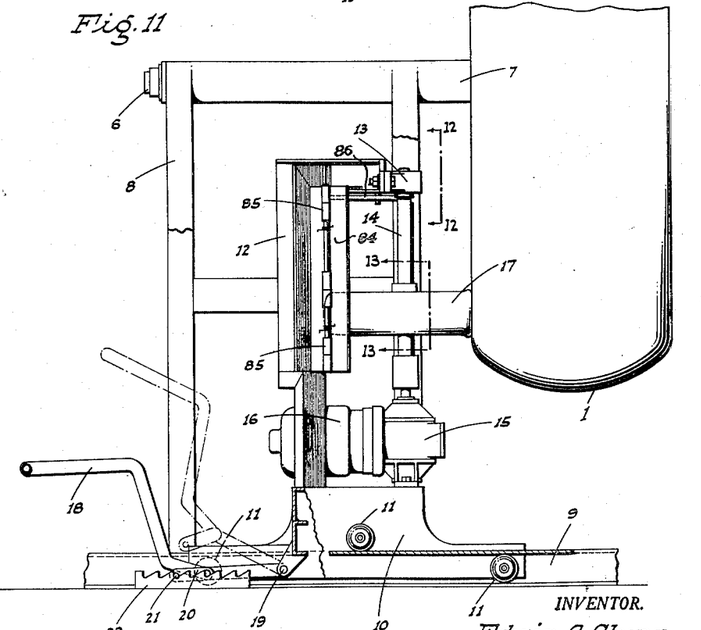
Fig. 11 is a side elevation of the same.
Figure 12:
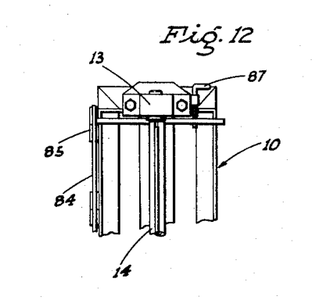
Fig. 12 is a fragmentary end elevation on line 12—12 of Fig. 11.

As will be clearly seen from Fig. 11, the braking plate 84 extends parallel to the wheel drive shaft 14 for the full length of possible adjustment of the wheel along the shaft. This enables the wheel to be braked regardless of the position of the wheel on the shaft.

By manipulating the latch 87 and the lever arm 86, which are readily accessible, the operator can effectively secure the wheel 17 and tire 1 against rotation during the manual application of the camelback 83; it being the practice to manually apply a portion of the camelback strip, which is continuous, and to then part-rotate the wheel and lock it up for the application of a further portion of the camelback. This is carried on step by step until the camelback fully encircles the tire.

The manual application of the camelback 83 cannot be forceful enough to create the necessary bond between the rasped crown surface and camelback. To accomplish this bond a transverse axis stitching roller 88 is secured to the mounting plate 72 ahead of the spindle 73, by means of a supporting bracket 89. See Fig. 19.

With the stitching roller so mounted it is advanced to proper position, for engagement with the camelback 83, by proper manipulation of the adjustment screw unit 70. Thereafter, the housing 36, the carriage 66, and the stitching roller 88 are caused to traverse an arcuate path just as before, but here the roller 88 runs in forceful engagement with the camelback 83, moving from one side to the other thereof as the tire 1 rotates. This positively bonds the camelback 83 against the rasped crown surface of the tire preparatory to subsequent placement of the latter in a heated tire mold for vulcanization of the new tread.

Figure 1:
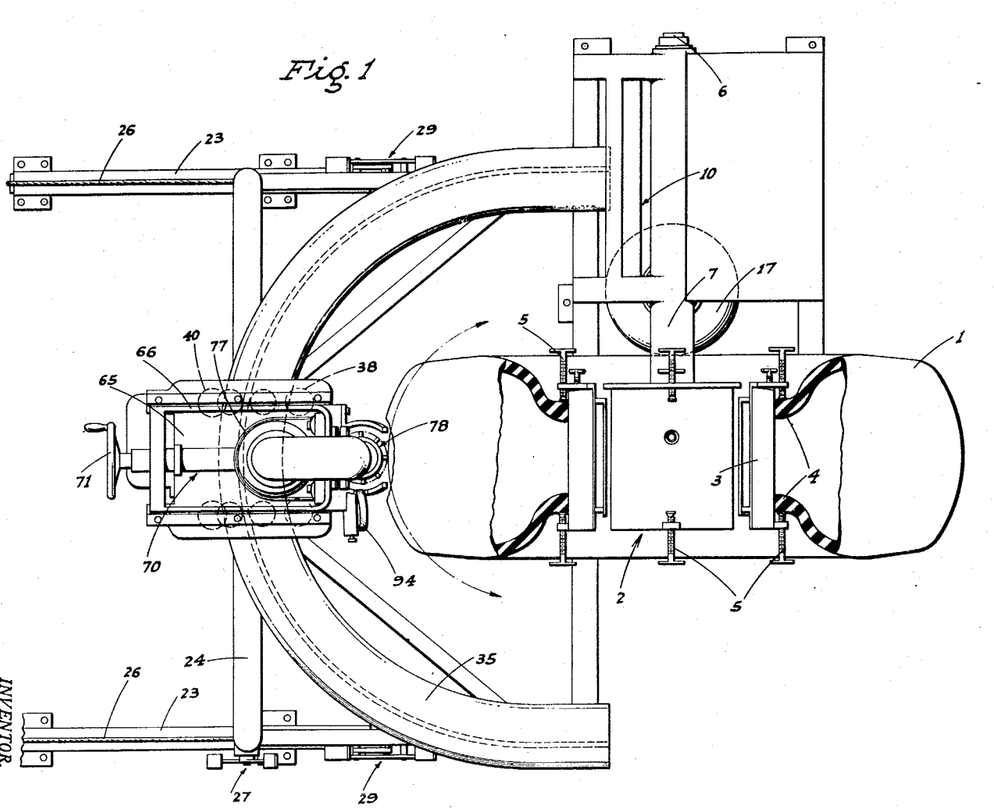
Fig. 1 is a top plan view of the machine as in use.
Figures 2, 19:
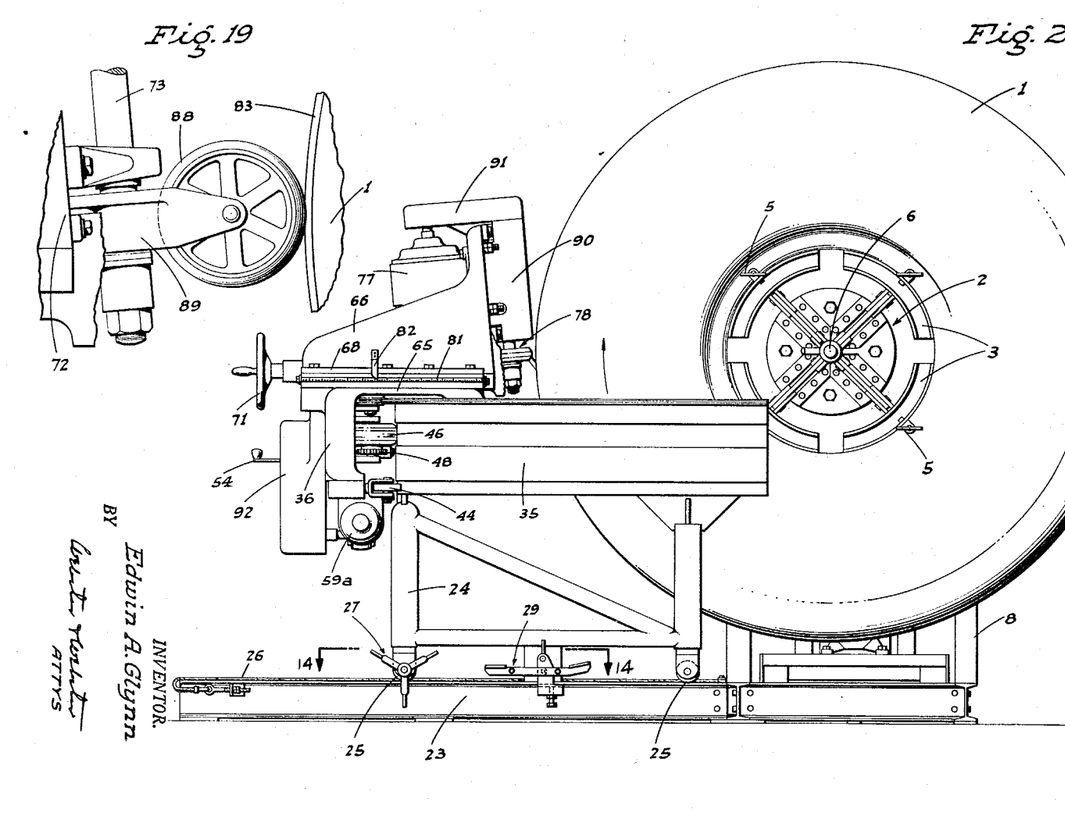
Fig. 2 is a side elevation of the same.
Fig. 19 is a fragmentary elevation showing the stitching roller as mounted in connection with and projecting forwardly from the carriage.
Figure 3:
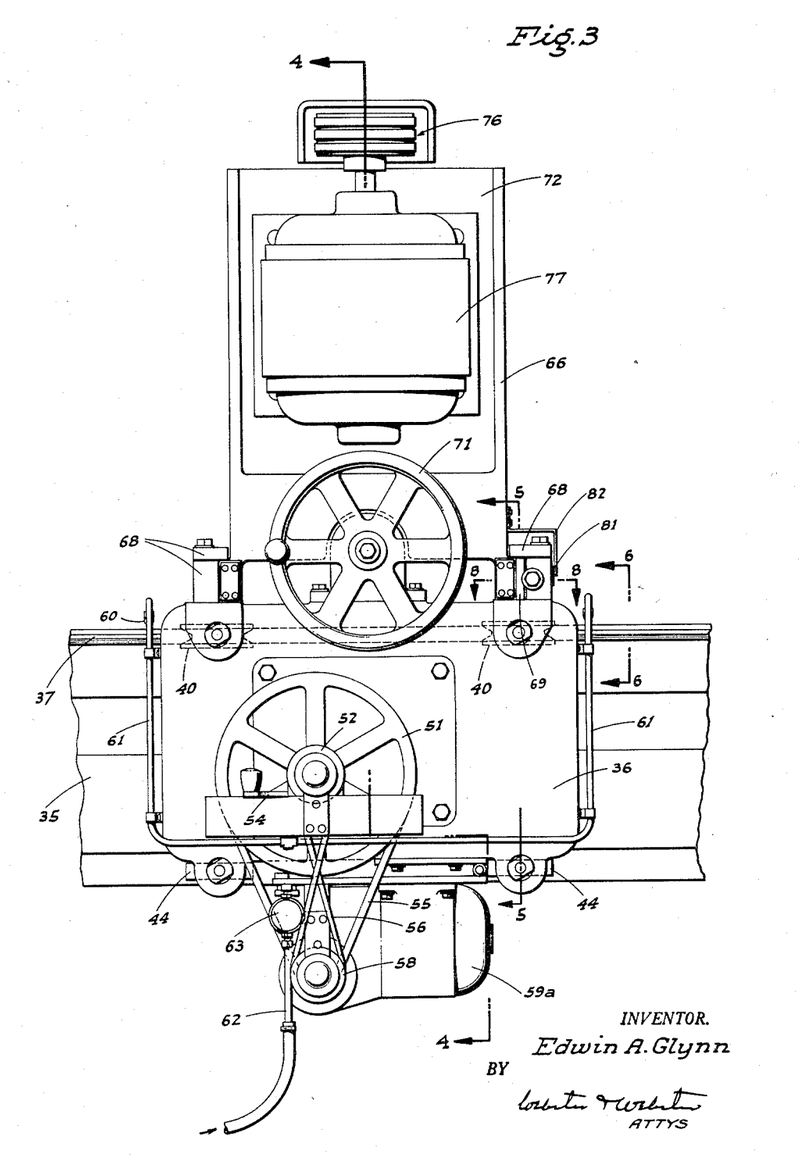
Fig. 3 is an enlarged outer end elevation showing mainly the power driven, worn tread removing device.

As shown in Fig. 2, the spindle 73, the endless belt and pulley unit 76, and the assembly of the endless belts 55 and 56 with their related pulleys, are enclosed within protective housings or shields 90, 91, and 92.

Figures 14, 15, 16, 17:
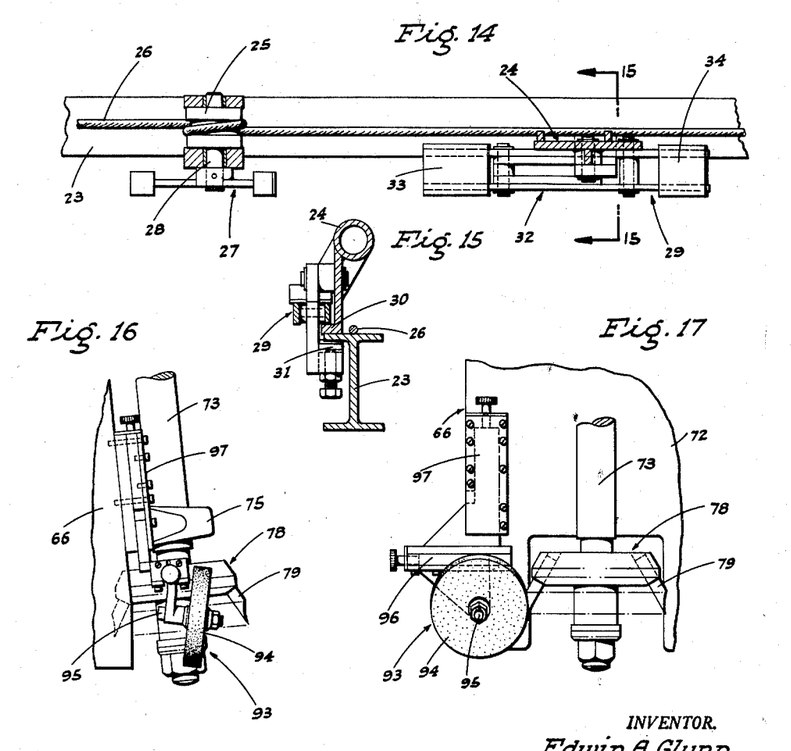
Fig. 14 is an enlarged fragmentary sectional plan view on line 14—14 of Fig. 2.
Fig. 15 is a transverse vertical section on line 15—15 of Fig. 14.
Fig. 16 is a fragmentary side elevation showing the adjustably mounted grinder wheel for sharpening the rotary cutter teeth.
Fig. 17 is a front elevation of the same.

When the machine is in operation using the rotary cutter 78, it is necessary—because of the abrasive character of the worn tread—that the cutter teeth 79 be frequently resharpened, and this is accomplished by a grinder wheel unit—indicated generally at 93, and shown in Figs. 16 and 17—secured on the mounting plate 72, and constructed as follows:

A grinder wheel 94 is disposed adjacent but normally clear of the path of rotation of the cutter teeth 79; such grinder wheel 94 being journaled on a spindle 95 which in turn is secured to a horizontally adjustable slide 96, which slide is carried by a vertically adjustable slide 97. By adjustment of the slides 96 and 97, the grinder wheel 94 is brought into proper engagement with the rotating cutter teeth 79, effectively sharpening the latter. After each such sharpening operation the grinder wheel 94 is retracted to an out-of-the-way or inoperative position.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a tire detreading machine, means to support a tire in an upstanding position with its axis horizontal, a horizontal track surrounding the tread portion of the tire on one side and transversely thereof, a mount supporting a tire working tool in position above the track for engagement of the tool with the tread of a tire, a drive wheel journaled on the mount and engaging the track in driving relation, drive means for the wheel including a shaft journaled on the mount and operatively connected to the wheel, a pair of spaced pulleys turnable on the shaft, means including a motor on the mount selectively driving the pulleys at different speeds and in reverse directions, and a single manually shiftable clutch unit splined on the shaft between the pulleys and selectively and alternately engageable therewith.

2. In a tire detreading machine, means to support a tire in an upstanding position with its axis horizontal, a horizontal track surrounding the tread portion of the tire on one side and transversely thereof, a mount supporting a tire working tool in position above the track for engagement of the tool with the tread of a tire, a drive wheel journaled on the mount and engaging the track in driving relation, a power unit, means to drive the wheel in one direction by said power unit at a certain speed, and means actuated by said power unit and included in part with the first named means to drive the wheel in the opposite direction at a greater speed.

3. In a tire detreading machine, a horizontal circular track arranged in substantially concentric relation to the crown of a tire supported on the machine with its axis horizontal, the track being T-shaped in cross section to provide a top flange and a depending web, a hollow open-ended housing to support a tire working tool and through which housing the track extends, grooved rollers in the housing engaging the edges of the flange in housing-supporting and guiding relation, a friction wheel within the housing engaging the web in driving relation, and power means mounted on the housing and connected to the wheel.

4. A tire detreading machine comprising a horizontal-axis rotary tire-supporting drum, a horizontal fixed track disposed outwardly of the crown of a supported tire in crossing relation thereto and below the horizontal diametral plane of the tire, a mount movable along the track, a carriage supported on the mount for movement in a direction substantially radially of the track, and a driven substantially vertical-axis rotary cutter head mounted on the carriage in position to engage the crown of the tire adjacent said horizontal diametral plane thereof; the rotary cutter head comprising a body, and a plurality of circumferentially spaced cutting teeth mounted on and projecting from the body substantially radially thereof at a downward and outward incline.

References Cited in the file of this patent

UNITED STATES PATENTS

| | | |
|---|---|---|
| 291,675 | Brunet | Jan. 8, 1884 |
| 682,803 | Maldeis | Sept. 17, 1901 |
| 1,386,534 | Rogers | Aug. 2, 1921 |
| 1,590,990 | Fuller | June 29, 1926 |
| 1,709,639 | Valelly | Apr. 16, 1929 |
| 1,891,789 | Wheeler | Dec. 20, 1932 |
| 2,009,524 | Schmidt | July 30, 1935 |
| 2,105,316 | Fleming | Jan. 11, 1938 |
| 2,132,835 | Stevens | Oct. 11, 1938 |
| 2,159,786 | Errig et al. | May 23, 1939 |
| 2,167,017 | Wikle | July 25, 1939 |
| 2,321,936 | Pollock | June 15, 1943 |
| 2,617,365 | Martin | Nov. 11, 1952 |